United States Patent
Baita et al.

(10) Patent No.: US 10,077,322 B2
(45) Date of Patent: Sep. 18, 2018

(54) PROCESS FOR THE POLYMERIZATION OF ETHYLENE

(71) Applicant: BASELL POLIOLEFINE ITALIA S.R.L., Milan (IT)

(72) Inventors: Pietro Baita, Ferrara (IT); Tiziano Dall'Occo, Ferrara (IT); Maria Di Diego, Ferrara (IT); Dario Liguori, Ferrara (IT); Lorella Marturano, Ferrara (IT); Andreas Maus, Frankfurt am Main (DE); Gabriele Mei, Ferrara (IT); Gerhardus Meier, Ferrara (IT); Giampiero Morini, Ferrara (IT); Roberta Pica, Ferrara (IT); Ulf Schueller, Frankfurt am Main (DE)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 15/533,856

(22) PCT Filed: Dec. 1, 2015

(86) PCT No.: PCT/EP2015/078127
§ 371 (c)(1),
(2) Date: Jun. 7, 2017

(87) PCT Pub. No.: WO2016/091644
PCT Pub. Date: Jun. 16, 2016

(65) Prior Publication Data
US 2017/0327603 A1  Nov. 16, 2017

(30) Foreign Application Priority Data
Dec. 9, 2014  (EP) .................................. 14196869

(51) Int. Cl.
*C08F 4/649* (2006.01)
*C08F 4/654* (2006.01)
*C08F 110/02* (2006.01)
*C08F 210/02* (2006.01)
*C08F 2/34* (2006.01)

(52) U.S. Cl.
CPC .............. *C08F 2/34* (2013.01); *C08F 4/6493* (2013.01); *C08F 4/6494* (2013.01); *C08F 110/02* (2013.01); *C08F 2410/02* (2013.01); *C08F 2500/12* (2013.01); *C08F 2500/18* (2013.01)

(58) Field of Classification Search
CPC .......... C08F 4/65; C08F 4/649; C08F 6/6425; C08F 4/6426; C08F 110/02; C08F 210/02
See application file for complete search history.

(56) References Cited

U.S. PATENT DOCUMENTS

| | | |
|---|---|---|
| 4,954,470 A | 9/1990 | Nowlin et al. |
| 5,093,443 A | 3/1992 | Nowlin et al. |
| 5,114,896 A * | 5/1992 | Yashiro .................. C08F 10/00 502/111 |
| 5,863,995 A | 1/1999 | Daire |
| 6,660,817 B2 | 12/2003 | Farrer et al. |
| 2002/0120078 A1 | 8/2002 | Luo et al. |

FOREIGN PATENT DOCUMENTS

| | | |
|---|---|---|
| CN | 102432709 A | 5/2012 |
| JP | 3322911 B2 | 9/2002 |
| KR | 20030070062 A | 8/2003 |
| RU | 2075484 C1 | 3/1997 |
| RU | 2375378 C1 | 12/2009 |

OTHER PUBLICATIONS

International Search Report and Written Opinon dated Apr. 21, 2016 (Apr. 21, 2016) for Corresponding PCT/EP2015/078127.

* cited by examiner

Primary Examiner — Caixia Lu

(57) ABSTRACT

The present disclosure provides a gas-phase polymerization process for preparing polyethylene, wherein halogenated alcohols in combination with a Ti based catalyst component and aluminum alkyls as co-catalyst suppress ethane formation or increase polymerization activity.

13 Claims, No Drawings

PROCESS FOR THE POLYMERIZATION OF ETHYLENE

This application is the U.S. National Phase of PCT International Application PCT/EP2015/078127, filed Dec. 1, 2015, claiming benefit of priority to European Patent Application No. 14196869.3, filed Dec. 9, 2014, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a gas-phase process for the polymerization of (a) ethylene as well as (b) mixtures of ethylene with olefins $CH_2=CHR$, wherein R is an alkyl, cycloalkyl or aryl radical having 1-12 carbon atoms, carried out in the presence of a catalyst made from or containing (a) a solid catalyst component made from or containing Ti, Mg, halogen and optionally an electron donor, (b) an aluminum alkyl compound and (c) specific halogenated alcohols, wherein the process is characterized by reduced ethane formation.

BACKGROUND OF THE INVENTION

Gas-phase polymerization is a technique for preparing polyethylene, which can be carried out in a fluidized or stirred bed reactor in the presence of a catalyst, ethylene, fluidization gas and a molecular weight regulator. In some processes, the molecular weight regulator is hydrogen.

For a catalyst system, gas-phase ethylene polymerization activity can depend on the polymerization conditions, such as temperature and pressure. In some instances and when the activity is not satisfactory, the amount of catalyst fed to the reactor is increased or the residence time of the reactor is increased.

Titanium based Ziegler-Natta catalysts can be used for the gas-phase polymerization of ethylene in combination with aluminum alkyls. When hydrogen is used as molecular weight regulator, a fraction of ethylene is reduced to ethane thereby lowering the amount of ethylene available for polymerization. Moreover, as during the continuous polymerization ethane accumulates in the ethylene, removal of the ethane becomes necessary and can be achieved by distillation or by purging. The problem of ethane production is pronounced when producing ethylene polymers having relatively low molecular weight.

SUMMARY OF THE INVENTION

In a general embodiment, the present disclosure provides a process for the preparation of an ethylene (co)polymer including the step of polymerizing a gas mixture made from or containing ethylene, hydrogen, an inert fluidizing gas and optionally one or more alpha olefins $CH_2=CHR$ where R is a $C_1$-$C_{10}$ hydrocarbon group, in the presence of a catalyst system made from or containing (A) a solid catalyst component made from or containing a titanium compound supported on magnesium dichloride, (B) an aluminum alkyl compound, and (C) an halogenated alcohol of formula AOH where A is a $C_1$-$C_{10}$ saturated or unsaturated hydrocarbon group in which at least one of the hydrogen atoms is replaced by a chlorine atom, wherein the process being characterized by generating an amount of ethane lower than the amount generated under the same polymerization conditions in the absence of the halogenated alcohol (C).

In a general embodiment, the present disclosure provides a method for reducing the ethane generation in a polymerization process including the step of polymerizing a gaseous mixture made from or containing ethylene, hydrogen, an inert fluidizing gas and optionally one or more alpha olefins $CH_2=CHR$ where R is a $C_1$-$C_{10}$ hydrocarbon group, in the presence of a (i) catalyst system made from or contains (A) a solid catalyst component made from or containing a titanium compound supported on magnesium dichloride and (B) an aluminum alkyl compound and (ii) a halogenated alcohol of formula AOH where A is a $C_1$-$C_{10}$ saturated or unsaturated hydrocarbon group in which at least one of the hydrogen atoms is replaced by a chlorine atom.

DETAILED DESCRIPTION OF THE INVENTION

In some embodiments, the A group has up to 8 carbon atoms, alternatively, up to 5 carbon atoms. In some embodiments, the A group is a saturated linear hydrocarbon group having up to four carbon atoms. In some embodiments, the chlorine atom replaces one or more hydrogen linked on the carbon atom in alpha position with respect to the hydroxyl group. In some embodiments, at least two atoms of hydrogen are replaced by chlorine, alternatively at least three atoms of hydrogen are replaced by chlorine. In some embodiments, the halogenated alcohol is 2,2,2,-trichloroethanol.

In some embodiments, the halogenated alcohol compound (C) is used in amounts such as to give a molar ratio (C)/Ti (where Ti is the titanium molar amount within component (A)), ranging from about 0.1 to about 10, alternatively from about 0.5 to about 8 and alternatively from about 0.5 to about 6.

In some embodiments, the titanium compounds have the formula $Ti(OR^{II})_n X_{y-n}$, wherein n is a number between 0 and 0.5 inclusive, y is the valence of titanium, $R^{II}$ is an alkyl, cycloalkyl or aryl radical having 1-8 carbon atoms and X is halogen. In some embodiments, $R^{II}$ can be ethyl, isopropyl, n-butyl, isobutyl, 2-ethylhexyl, n-octyl and phenyl, (benzyl). In some embodiments, X is chlorine.

In some embodiment, y is 4 and n varies from 0 to 0.02. In some embodiments, y is 3 and n varies from 0 to 0.015. In some embodiments, the titanium compound is $TiCl_4$.

In some embodiments, the solid catalyst component (A) is further made from or contains an internal electron donor compound (internal donor). In some embodiments, the internal electron donor is selected from the group including ethers, esters, amines and ketones. In some embodiments, the internal electron donor compound (ID) is used in amount such as to give ID/Ti ratios from about 0.1 to about 8, alternatively from about 0.5 to about 7 and alternatively from about 1 to about 6.

In some embodiments, internal electron donor compounds are selected from esters of aliphatic or aromatic carboxylic acids, alkoxybenzenes, cyclic alkyl ethers, and diethers. In some embodiments, the internal electron donor compound is selected from the group consisting of phthalates, acetates, and benzoates. In some embodiments, the internal electron donor compound is ethylacetate or tetrahydrofurane;

In some embodiments, the solid catalyst component (A) can have a porosity $P_F$ (deriving from pores with radius up to 1µ) determined with the mercury method ranging from about 0.2 to about 0.80 cm³/g, alternatively from about 0.3 to about 0.70 cm³/g, and alternatively in the range from about 0.35 to about 0.60 cm³/g.

In some embodiments, the surface area measured by the BET method is lower than about 80, alternatively between about 10 and about 70 m$^2$/g. In some embodiments, the porosity measured by the BET method is between about 0.10 and about 0.50, alternatively from about 0.10 to about 0.40 cm$^3$/g.

In some embodiments, the particles of solid component have substantially spherical morphology and average diameter between about 30 and about 150 μm, alternatively from about 40 to about 100 μm. As used herein, the phrase "particles having substantially spherical morphology" refers to those particles wherein the ratio between the greater axis and the smaller axis is equal to or lower than about 1.5, alternatively lower than about 1.3.

In some embodiments, a method for preparing the spherical components includes a step (a) in which a compound MgCl$_2$.mR$^{III}$OH, wherein 0.3≤m≤1.7 and R$^{III}$ is an alkyl, cycloalkyl or aryl radical having 1-12 carbon atoms is reacted with a titanium compound of the formula Ti(OR$^I$)$_n$X$_{4-n}$, in which n, y, X and R$^I$ have the same meaning as previously defined herein.

In some embodiments, MgCl$_2$.mR$^{III}$OH represents a precursor of Mg dihalide. In some embodiments, these compounds are obtained by mixing alcohol and magnesium chloride in the presence of an inert hydrocarbon immiscible with the adduct, operating under stirring conditions at the melting temperature of the adduct (100-130° C.). Then, the emulsion is quenched, thereby causing the solidification of the adduct in form of spherical particles. In some embodiments, the methods for preparing these spherical adducts are disclosed in U.S. Pat. No. 4,469,648, U.S. Pat. No. 4,399,054, and Patent Cooperation Treaty Publication No. WO98/44009, incorporated herein by reference. In some embodiments, the method for the spherulization is the spray cooling disclosed in U.S. Pat. No. 5,100,849 and U.S. Pat. No. 4,829,034. Adducts having the selected final alcohol content can be obtained by directly using the selected amount of alcohol directly during the adduct preparation. In some embodiments, if adducts with increased porosity are to be obtained, it is appropriate to first prepare adducts with more than 1.7 moles of alcohol per mole of MgCl$_2$ and then subject the adducts to a thermal and/or chemical dealcoholation process. The thermal dealcoholation process is carried out in nitrogen flow at temperatures between 50 and 150° C. until the alcohol content is reduced to the value ranging from about 0.3 to about 1.7. In some embodiments, the process is as disclosed in European Patent Application No. EP 395083.

In some embodiments, these dealcoholated adducts have a porosity (measured by mercury method) due to pores with radius up to 1 μm, ranging from about 0.15 to about 2.5 cm$^3$/g, alternatively from about 0.25 to about 1.5 cm$^3$/g.

In the reaction of step (a) the molar ratio Ti/Mg is stoichiometric or higher; alternatively this ratio is higher than about 3. In some embodiments, a large excess of titanium compound is used. In some embodiments, the titanium compounds are titanium tetrahalides. In some embodiments, the titanium compound is TiCl$_4$. In some embodiments, the reaction with the Ti compound can be carried out by suspending the adduct in cold TiCl$_4$. In some embodiments, the temperature is about 0° C. Next, the mixture is heated up to 80-140° C. and kept at this temperature for 0.5-8 hours, alternatively from about 0.5 to about 3 hours. In some embodiments, the excess titanium compound is separated at high temperatures by filtration or sedimentation and siphoning. The step (a) can be repeated twice or more. In cases of catalysts containing an electron donor compound, the electron donor compound can be added together with the titanium compound in the reaction system for reaction with the MgCl$_2$.mR$^{III}$OH adduct.

In some embodiments, the internal electron donor compound is added separately in a further step after the completion of the reaction between the adduct and the titanium compound. Some embodiments of this addition step are as disclosed in Patent Cooperation Treaty Publication No. WO2004/106388.

In some embodiments, before adding the internal electron donor, the solid catalyst component resulting from step (a) is subject to prepolymerization in the presence of aluminum alkyls, small amount of monomer and optionally an external donor. Some embodiments of this prepolymerization step are disclosed in Patent Cooperation Treaty Application No. PCT/EP2014/061958.

The catalyst component (B) is selected from Al-alkyl compounds, alternatively halogenated. In some embodiments, the catalyst component (B) is selected from Al-trialkyl compounds. In some embodiments, the Al-trialkyl compound is Al-trimethyl, Al-triethyl, Al-tri-n-butyl, or Al-triisobutyl. In some embodiments, the Al/Ti ratio is higher than about 1, alternatively between about 5 and about 800.

In some embodiments, the molar ratio between component (B) and component (C) is from about 10 to about 100, alternatively from about 12 to about 60, and alternatively from about 15 to about 50.

The above-mentioned components (A)-(B) and the halogenated alcohol (C) can be fed to the polymerization reactor in several ways. In some embodiments, the components are fed separately into the polymerization reactor. In another embodiment, a pre-contact of the components (A)-(C) is used, optionally in the presence of small amounts of olefins, for a period of time ranging from about 0.1 to about 120 minutes, alternatively in the range from about 1 to about 60 minutes. In some embodiments, the pre-contact is carried out in a liquid diluent at a temperature ranging from about 0 to about 90° C., alternatively in the range of about 20 to about 70° C.

In some embodiments, the components (A)-(B) are pre-contacted under specified conditions and then fed to the reactor where the halogenated alcohol is separately fed.

In some embodiments, the catalyst system (A)-(B), with the optional presence of halogenated alcohol (C), is used directly in the main gas-phase polymerization process or alternatively, pre-polymerized. In some embodiments, the pre-polymerization step is used when a pre-polymerization has not yet occurred in the preparation of the solid catalyst component A. The pre-polymerization can be carried out with any of the olefins CH$_2$=CHR, where R is H or a C$_1$-C$_{10}$ hydrocarbon group. In some embodiments, ethylene, propylene or mixtures thereof are pre-polymerized with one or more α-olefins, forming amounts of polymer from about 0.1 g per gram of solid component up to about 1000 g per gram of solid catalyst component. In some embodiments, the mixtures contain up to about 20% in moles of α-olefin. In some embodiments, the pre-polymerization step occurs at temperatures from about 0 to about 80° C., alternatively from about 5 to about 70° C., in the liquid or gas phase. In some embodiments, the pre-polymerization step is performed in-line as a part of a continuous polymerization process or separately in a batch process. In some embodiments, the batch pre-polymerization of the catalyst with propylene produces an amount of polymer ranging from about 0.5 to about 20 g per gram of catalyst component. In some embodiments, the pre-polymerized catalyst component is subject to a further treatment with a titanium compound before being used in the main polymerization step. In some embodiments of this further treatment, the titanium compounds is TiCl$_4$. In some embodiments, the reaction with the Ti compound is carried out by suspending the prepolymerized catalyst component in the liquid Ti compound optionally in mixture with a liquid diluent; the mixture is heated to 60-120° C. and kept at this temperature for 0.5-2 hours.

In some embodiments, the gas-phase polymerization process is carried out at a temperature ranging from about 60 to about 130° C., alternatively from about 70 to about 110° C. In some embodiments, the total pressure of the gas-phase ranges from about 10 to about 40, alternatively from about 15 to about 35 bar. In some embodiments, the fluidizing inert gas is nitrogen or propane.

In some embodiments, the gas-phase process for the polymerization of olefins includes the following steps in any mutual order:
a) polymerizing ethylene, optionally together with one or more comonomers, in a first gas-phase reactor in the presence of a first amount of hydrogen and of a catalyst system made from or containing (A) a solid catalyst component made from or containing a titanium compound supported on magnesium dichloride and (B) an aluminum alkyl compound;
b) polymerizing ethylene optionally with one or more comonomers in a second gas-phase reactor in the presence of (i) a second amount of hydrogen less than the first amount of hydrogen in step a) and (ii) the catalysts system as defined in step (a);
wherein, in at least one of the gas-phase reactors, the growing polymer particles flow upward through a first polymerization zone (riser) under fast fluidization or transport conditions, leave the riser and enter a second polymerization zone (downcomer) through which the particles flow downward under the action of gravity, leave the downcomer and are reintroduced into the riser, thereby establishing a circulation of polymer between the two polymerization zones and
wherein, in at least one of the reactors, the polymerization is carried out in the further presence of (C) an halogenated alcohol of formula AOH where A is a $C_1$-$C_{10}$ saturated or unsaturated hydrocarbon group in which at least one of the hydrogen atoms is replaced by a chlorine atom.
In the first polymerization zone (riser), fast fluidization conditions are established by feeding a gas mixture made from or containing one or more olefins (ethylene and comonomers) at a velocity higher than the transport velocity of the polymer particles. In some embodiments, the velocity of the gas mixture is between about 0.5 and about 15 m/s, alternatively between about 0.8 and about 5 m/s. The terms "transport velocity" and "fast fluidization conditions" are used herein as defined in "D. Geldart, Gas Fluidisation Technology, page 155 et seq., J. Wiley & Sons Ltd., 1986" (incorporated herein by reference).

In the second polymerization zone (downcomer), the polymer particles flow under the action of gravity in a densified form, so that high values of density of the solid are reached (mass of polymer per volume of reactor), which approach the bulk density of the polymer. In other words, the polymer flows vertically down through the downcomer in a plug flow (packed flow mode), so that minimal quantities of gas are entrained between the polymer particles.

In some embodiments and in step (b), a copolymerization of ethylene with one or more comonomers is carried out. In some embodiments, the compound (C) is present in both step a) and b).

When polymerizing ethylene, and optionally comonomers, in gas-phase, the amount of hydrogen used and the resulting pressure ratio $H_2/C_2^-$ depend on the type of polyethylene products to be produced and their desired molecular weight. Molecular weight can be expressed in terms of Melt Flow Rate, which is determined according to ASTM-D 1238 condition E. For relatively lower molecular weight (high values of MFR), a higher amount of hydrogen is used. In some embodiments, the resulting pressure ratio $H_2/C_2$ ranges from about 0.5 to about 5, alternatively from about 1 to about 4 and alternatively from about 1.5 to about 3.5.

In some embodiments, the catalysts are used for preparing very-low-density and ultra-low-density polyethylenes (VLDPE and ULDPE, having a density lower than about 0.920 g/cm$^3$, to about 0.880 g/cm$^3$) made from or containing copolymers of ethylene with one or more alpha-olefins having from 3 to 12 carbon atoms, having a mole content of units derived from ethylene of higher than about 80% as well as elastomeric copolymers of ethylene and propylene and elastomeric terpolymers of ethylene and propylene with smaller proportions of a diene having a content by weight of units derived from ethylene of between about 30 and about 70%.

The following examples are given in order to provide further description of the disclosed process in a non-limiting manner.

EXAMPLES

Characterizations

The properties are determined according to the following methods:
MIE flow index: ASTM-D 1238 condition E
MIF flow index: ASTM-D 1238 condition F
MIP flow index: ASTM D 1238 condition P
Bulk density: DIN-53194

Porosity and surface area with nitrogen: The measurement was determined according to the B.E.T. method.

Porosity and Surface Area with Mercury:

The measure was carried out using a "Pascal 240" series porosimeter.

The porosity was determined by intrusion of mercury under pressure. For this determination, a calibrated dilatometer (capillary diameter 3 mm) CD3P was connected to a reservoir of mercury and a high-vacuum pump. A weighed amount of sample was placed in the dilatometer. The apparatus was then placed under high vacuum (<0.1 mm Hg) for 20 minutes. The dilatometer was then connected to the mercury reservoir and the mercury filled the dilatometer to a height of 10 cm. The valve that connects the dilatometer to the vacuum pump was closed and then the mercury pressure was increased with nitrogen up to 140 kg/cm$^2$. Under the effect of the pressure, the mercury entered the pores and the mercury level decreased in response to the porosity of the material.

The porosity (cm$^3$/g) (for supports and catalysts derived from pores up to 1 μm) and the pore distribution curve, were directly calculated from the integral pore distribution curve, which is a function of the volume reduction of the mercury and applied pressure values.

Examples 1-3 and Comparative 1-2

Procedure for the Preparation of the Solid Catalyst Component (A)

A magnesium chloride and alcohol adduct containing about 3 mols of alcohol was prepared following the method described in Example 2 of U.S. Pat. No. 4,399,054 (incorporated herein by reference), at 2000 RPM instead of 10000 RPM. The adduct was subjected to a thermal treatment, under nitrogen stream, over a temperature range of 50-150° C. until a weight content of 25% of alcohol was reached.

Into a 2 L-necked round flask, purged with nitrogen, 1 L of $TiCl_4$ was introduced at 0° C. Then, at the same temperature, 70 g of a spherical $MgCl_2$/EtOH adduct containing 25% wt of ethanol and was added under stirring. The gas-phase fluidized bed reactor. The monomer, an antistatic agent (glycerol monostearate/Atmer), and a solution of 2,2,2,-trichloroethanol (cyclohexyl chloride in Comparative Examples 1 and 2) in hexane were added to the reactor. The reactor was operated under the conditions reported in Table 1. The polymer discharged from the final reactor was first transferred to the steaming section and then dried at 70° C. under a nitrogen flow and weighed. The polymer properties are reported in Table 1.

TABLE 1

| | | | EXAMPLE | | | | |
|---|---|---|---|---|---|---|---|
| | | | 1 | 2 | C1 | C2 | 3 |
| PCP | T | ° C. | 40 | 40 | 40 | 30 | 30 |
| | Alkyl Type | — | Tibal | Tibal | Tibal | Tibal | Tibal |
| | Alk/cat | g/g | 2 | 2 | 2 | 2.0 | 2.0 |
| FBR | T | ° C. | 80 | 80 | 80 | 80 | 80 |
| | P | bar | 27 | 27 | 27 | 29 | 29 |
| | Antistatic (AA) type | | GMS | GMS | GMS | Atmer | Atmer |
| | AA/polymer | ppm wt | 135 | 121 | 154 | 110 | 110 |
| | COMP. (C)/Ti | mol/mol | 1.9 | 1.0 | 1.3 | 2.2 | 1.4 |
| | $C_2^-$ | % | 10.4 | 11.4 | 12.1 | 5.1 | 4.7 |
| | $H_2/C_2^-$ | — | 2.7 | 2.5 | 2.8 | 1.8 | 1.7 |
| | $C_2^+$/PE | kg/ton PE | 1.9 | 2.4 | 3.3 | 0.8 | 0.6 |
| | Spec. Mileage | g/g | 491 | 355 | 363 | 1178 | 1154 |
| | MIE | g/10' | 140.0 | 150 | 140 | 10.7 | 9.4 |
| | PBD | g/cc | 0.490 | 0.482 | 0.485 | 0.438 | 0.442 | temperature was raised to 140° C. in 2 h and maintained for 120 minutes. Then, the stirring was discontinued, the solid product was allowed to settle, and the supernatant liquid was siphoned off. The solid residue was then washed once with heptane at 80° C. and five times with hexane at 25° C. and dried under vacuum at 30° C.

Into a 260 cm³ glass reactor under stirring, 351.5 cm³ of hexane and 7 g of the catalyst component were added at 20° C. While keeping the internal temperature constant, 5.6 cm³ of tri-n-octylaluminum (TNOA) in hexane (about 370 g/l) were slowly added into the reactor. The temperature was brought to 10° C. After 10 minutes stirring, 10 g of propylene were added into the reactor at the same temperature over a time of 4 hours. The consumption of propylene in the reactor was monitored. The polymerization was discontinued when a theoretical conversion of 1 g of polymer per g of catalyst was reached. Then, the whole content was filtered and washed three times with hexane at a temperature of 30° C. (50 g/l). After drying, the resulting pre-polymerized catalyst (A) was analyzed and found to contain 1.05 g of polypropylene per g of initial catalyst, 2.7% Ti, 8.94% Mg and 0.1% Al.

Polymerization Procedure

The polymerization process was carried out in a plant working continuously and equipped with a small reactor (pre-contacting pot) in which the catalyst components are mixed to form the catalytic system, a second transit vessel receiving the catalytic system formed in the previous reactor and one fluidized bed reactor (polymerization reactors) kept under fluidization conditions with propane receiving the catalyst mixture coming from the previous reactor.

The following reactants were fed to the pre-contacting pot:
the solid catalyst component
liquid propane as diluent
a solution of TIBAL The catalytic system was fed from the pre-contacting section (first vessel) to the second vessel and then to the Examples 4-6 and Comparative 3-4

Preparation of the Solid Component (A)

A magnesium chloride and alcohol adduct containing about 3 mols of alcohol was prepared following the method described in Example 2 of U.S. Pat. No. 4,399,054 (incorporated herein by reference), at 2000 RPM instead of 10000 RPM. The adduct was subjected to a thermal treatment, under nitrogen stream, over a temperature range of 50-150° C. until a weight content of 24.4% of alcohol was reached.

Into a 2 L four-necked round flask, purged with nitrogen, 1 L of $TiCl_4$ was introduced at 0° C. Then, at the same temperature, 70 g of a spherical $MgCl_2$/EtOH adduct containing 24.4% wt of ethanol and was were added under stirring. The temperature was raised to 130° C. in 2 h and maintained for 90 min. Then, the stirring was discontinued, the solid product was allowed to settle, and the supernatant liquid was siphoned off. A new amount of fresh $TiCl_4$ was added to the flask, such to reach the initial liquid volume. The temperature was maintained at 130° C. for 90 minutes. Again, the solid was allowed to settle, and the liquid was siphoned off. The solid was then washed three times with anhydrous iso-hexane (400 mL at each washing) at 60° C. and twice at 40° C.

At the end, the residual solid was suspended in 600 mL of dry iso-hexane. At the same temperature and under stirring, 92 ml of Ethylacetate were added dropwise.

The temperature was raised to 50° C., and the mixture was stirred for 2 hours. Then, the stirring was discontinued, the solid product was allowed to settle, and the supernatant liquid was siphoned off The solid was washed twice with anhydrous hexane (2×100 mL) at 40° C., recovered, dried under vacuum and analyzed.

Mg=15.0% wt, Ti=2.4 wt %, AcOEt=26.9% wt

Polymerization Procedure

The polymerization process was carried out in the same apparatus described for Example 1, excepting the prepolymerization of the catalyst occurred according to the conditions reported in Table 2.

TABLE 2

| | | | EXAMPLE | | | | |
|---|---|---|---|---|---|---|---|
| | | | C3 | 4 | 5 | C4 | 6 |
| PCPs | T | °C. | 60 | 60 | 60 | 60 | 60 |
| | tau | min | 29 | 29 | 29 | 55 | 55 |
| | Alkyl Type | — | Teal | Teal | Teal | Teal | Teal |
| | Alk/cat | g/g | 6.0 | 6.0 | 6.0 | 6.0 | 6.0 |
| | Alk/THF | g/g | 44.0 | 44.0 | 44.0 | 44.0 | 44.0 |
| Prepoly | T | °C. | 60 | 60 | 60 | 60 | 60 |
| | $C_2^=$feed/CAT | g/g | 11 | 11 | 11 | 10 | 10 |
| | $H_2/C_2^=$ | Mol. Ratio | 0.25 | 0.25 | 0.25 | 0.25 | 0.25 |
| FBR | T | °C. | 80 | 80 | 80 | 80 | 80 |
| | P | bar | 24 | 24 | 24 | 29 | 29 |
| | Antistatic (AA) type | | atmer | atmer | atmer | atmer | atmer |
| | AA/prod | ppm wt | 101 | 114 | 112 | 40 | 40 |
| | COMP. (C)/Ti | mol/mol | — | 4.1 | 2.8 | — | 2.6 |
| | $C_2^=$ | % | 14.2 | 13.7 | 13.6 | 9.7 | 10.0 |
| | $H_2/C_2^=$ | — | 2.1 | 2.1 | 1.8 | 1.8 | 1.8 |
| | $C_2^+$/PE | kg/ton PE | 5.9 | 2.8 | 2.5 | 1.5 | 1.0 |
| | Spec. Mil. | g/g · bar · h | 476 | 681 | 684 | 770 | 987 |
| | MIE | g/10' | 80.0 | 87.0 | 81.0 | 40.0 | 45.2 |
| | PBD | g/cc | 0.484 | 0.474 | 0.480 | 0.460 | 0.451 |

Example 7-8 and Comparative Example 5

The polymerization process was carried out in the same apparatus described in Example 1, excepting the catalyst was prepared as disclosed for Example 1 of Patent Cooperation Treaty Application No. PCT/EP2014/061958 (incorporated herein by reference) with tetrahydrofurane as an external donor. Atmer 163 was used as an antistatic instead of GMS. Polymerization conditions and results are reported in Table 3.

TABLE 3

| | | | EXAMPLE | | |
|---|---|---|---|---|---|
| | | | C5 | 7 | 8 |
| PCPs | T | °C. | 50 | 50 | 50 |
| | Alkyl Type | — | TEAL | TEAL | TEAL |
| | Alk/cat | g/g | 3.0 | 3.0 | 3.0 |
| | Alk/THF | g/g | 44.0 | 44.0 | 44.0 |
| FBR | T | °C. | 80 | 80 | 80 |
| | P | bar | 27 | 27 | 27 |
| | Antistatic (AA) type | | Atmer | Atmer | Atmer |
| | AA/prod | ppm wt | 102 | 95 | 97 |
| | Comp. (C)/Ti | mol/mol | — | 2.8 | 1.2 |
| | $C_2^=$ | % | 15.5 | 14.4 | 12.7 |
| | $H_2/C_2^=$ | — | 2.7 | 2.4 | 2.7 |
| | $C_2^+$/PE | kg/ton PE | 3.9 | 2.2 | 2.5 |
| | Spec. Mil. | g/g · bar · h | 302 | 355 | 379 |
| | MIE | g/10' | 84.0 | 83.0 | 84.0 |
| | PBD | g/cc | 0.408 | 0.425 | 0.422 |

What is claimed is:

1. A method for reducing ethane generation in the preparation of an ethylene (co)polymer comprising:
   polymerizing a gaseous mixture comprising;
   (a) ethylene,
   (b) hydrogen,
   (c) an inert fluidizing gas, and
   (d) optionally one or more alpha olefins $CH_2$=CHR where R is a $C_1$-$C_{10}$ hydrocarbon group,
   in the presence of
   (i) a catalyst system comprising
      (A) a pre-polymerized solid catalyst component comprising a titanium (Ti) compound supported on magnesium dichloride further comprising an internal donor (ID) selected from the group consisting of ethers, esters, amines and ketones, and
      (B) an aluminum alkyl compound, and
      (C) a halogenated alcohol of the general formula AOH, where A is a $C_1$-$C_{10}$ saturated or unsaturated hydrocarbon group wherein at least one of the hydrogen atoms is replaced by chlorine,
   wherein the molar ratio of AOH to Ti is about 0.5 to about 8.

2. The method of claim 1, wherein the A group has up to 8 carbon atoms.

3. The method of claim 1, wherein the A group is a saturated linear hydrocarbon group having up to four carbon atoms.

4. The method of claim 1, wherein the chlorine atom replaces one or more hydrogen atoms linked on the carbon atom in alpha position with respect to the hydroxyl group.

5. The method of claim 1, wherein at least two atoms of hydrogen are replaced by chlorine atoms.

6. The method of claim 1, wherein the gas mixture comprises the alpha-olefins and the R group is selected among $C_1$-$C_5$ linear alkyl groups.

7. The method of claim 1, wherein the compound (C) is 2,2,2,-trichloroethanol.

8. The method of claim 1, wherein the halogenated alcohol (C) is used in an amount such as to give a molar ratio (C)/Ti ranging from about 0.1 to about 10, where Ti is the titanium molar amount within component (A).

9. The method of claim 8, wherein the (C)/Ti molar ratio ranges from about 0.5 to about 8.

10. The method of claim 9, wherein the ID is used in an amount such as to give a ID/Ti ratios from about 0.1 to about 8.

11. The method of claim 1, wherein the process is carried out at a temperature of about 60 to about 130° C. and at total gas phase from about 10 to about 40 bar.

12. The method of claim 1, further comprising the following steps in any mutual order:
   a) polymerizing ethylene, optionally together with one or more comonomers, in a gas-phase reactor in the presence of a first amount of hydrogen and a catalyst system comprising (A) a pre-polymerized solid catalyst component comprising a titanium compound supported on magnesium dichloride, (B) an aluminum alkyl compound, and (C) a halogenated alcohol of the general formula AOH, where A is a $C_1$-$C_{10}$ saturated or unsaturated hydrocarbon group in which at least one of the hydrogen atoms is replaced by a chlorine atom;

b) copolymerizing ethylene with one or more comonomers in a second gas-phase reactor in the presence of (i) a second amount of hydrogen less than the first amount of hydrogen in step a) and (ii) the catalysts system as defined in step (a);

wherein, in at least one of the gas-phase reactors, the growing polymer particles flow upward through a first polymerization zone (riser) under fast fluidization or transport conditions, leave the riser and enter a second polymerization zone (downcomer) through which the particles flow downward under the action of gravity, leave the downcomer and are reintroduced into the riser, thereby establishing a circulation of polymer between two polymerization zones.

13. The method of claim 1, wherein the molar ratio of AOH to Ti is about 0.5 to about 6.

* * * * *